United States Patent
Sun et al.

(10) Patent No.: US 8,797,745 B2
(45) Date of Patent: Aug. 5, 2014

(54) SERVER CABINET

(75) Inventors: Zheng-Heng Sun, New Taipei (TW);
An-Gang Liang, Shenzhen (CN);
Ming-Yu Liu, Shenzhen (CN)

(73) Assignees: Hong Fu Jin Precision Industry (ShenZhen) Co., Ltd., Shenzhen (CN);
Hon Hai Precision Indusry Co., Ltd., New Taipei (TW)

( * ) Notice: Subject to any disclaimer, the term of this patent is extended or adjusted under 35 U.S.C. 154(b) by 169 days.

(21) Appl. No.: 13/491,558

(22) Filed: Jun. 7, 2012

(65) Prior Publication Data

US 2013/0308258 A1 Nov. 21, 2013

(30) Foreign Application Priority Data

May 16, 2012 (CN) .......................... 2012 1 0151595

(51) Int. Cl.
*H05K 7/14* (2006.01)

(52) U.S. Cl.
USPC ........... 361/724; 361/725; 361/748; 361/752; 312/223.1; 312/223.2

(58) Field of Classification Search
USPC ......................................................... 361/724
See application file for complete search history.

(56) References Cited

U.S. PATENT DOCUMENTS

| | | | | |
|---|---|---|---|---|
| 6,560,114 | B2 * | 5/2003 | Berry et al. | 361/727 |
| 6,839,237 | B2 * | 1/2005 | Berry et al. | 361/727 |
| 8,289,692 | B2 * | 10/2012 | Franz et al. | 361/679.33 |
| 2003/0081386 | A1 * | 5/2003 | Robillard et al. | 361/724 |
| 2003/0161114 | A1 * | 8/2003 | Berry et al. | 361/727 |
| 2003/0193781 | A1 * | 10/2003 | Mori | 361/725 |
| 2011/0051342 | A1 * | 3/2011 | Crippen et al. | 361/679.4 |
| 2013/0063900 | A1 * | 3/2013 | Wang | 361/726 |

* cited by examiner

*Primary Examiner* — Anthony Q Edwards
(74) *Attorney, Agent, or Firm* — Novak Druce Connolly Bove + Quigg LLP

(57) ABSTRACT

A server cabinet includes a rack and a server unit installed in the rack. The server unit includes a receiving portion extending rearward from a rear wall of the server unit adjacent to a sidewall of the server unit, a motherboard with a first connector, and a cable with a second connector. The motherboard is received in the server unit. The first connector is received in the receiving portion. The receiving portion defines a through hole adjacent to the sidewall. The second connector of the cable extends through the through hole, to be connected to the first connector of the motherboard.

14 Claims, 3 Drawing Sheets

SERVER CABINET

BACKGROUND

1. Technical Field

The present disclosure relates to a server cabinet.

2. Description of Related Art

Server cabinet includes a number of server units installed in a rack, and a number of cables connected between rear walls of the server units and the racks. However, in a disorderly fashion, the cables will occupy a large amount of space behind the server units in the rack.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
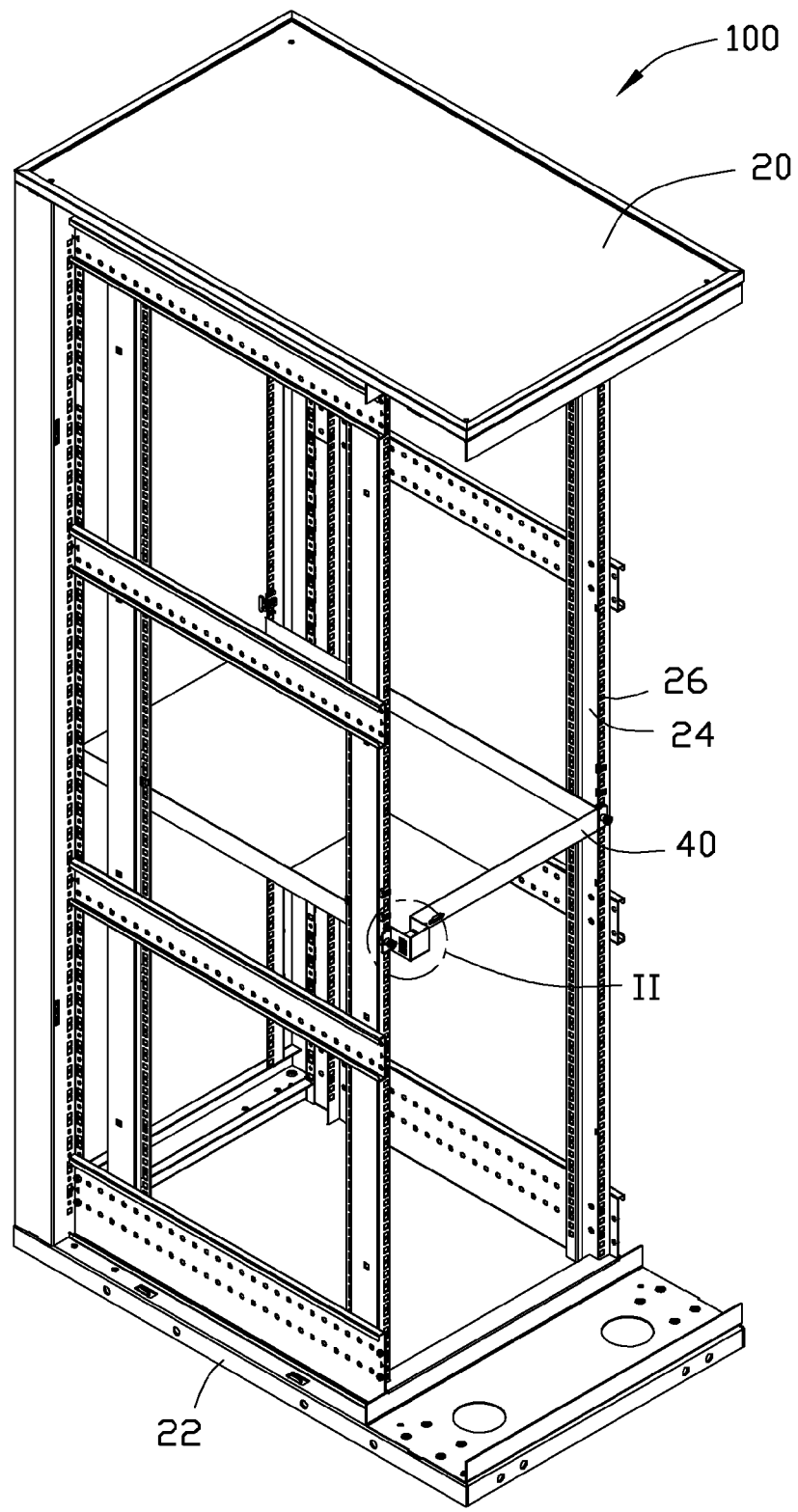
FIG. 1 is an isometric view of a first exemplary embodiment of a server cabinet, wherein the server cabinet includes a server unit.
Figure 2:
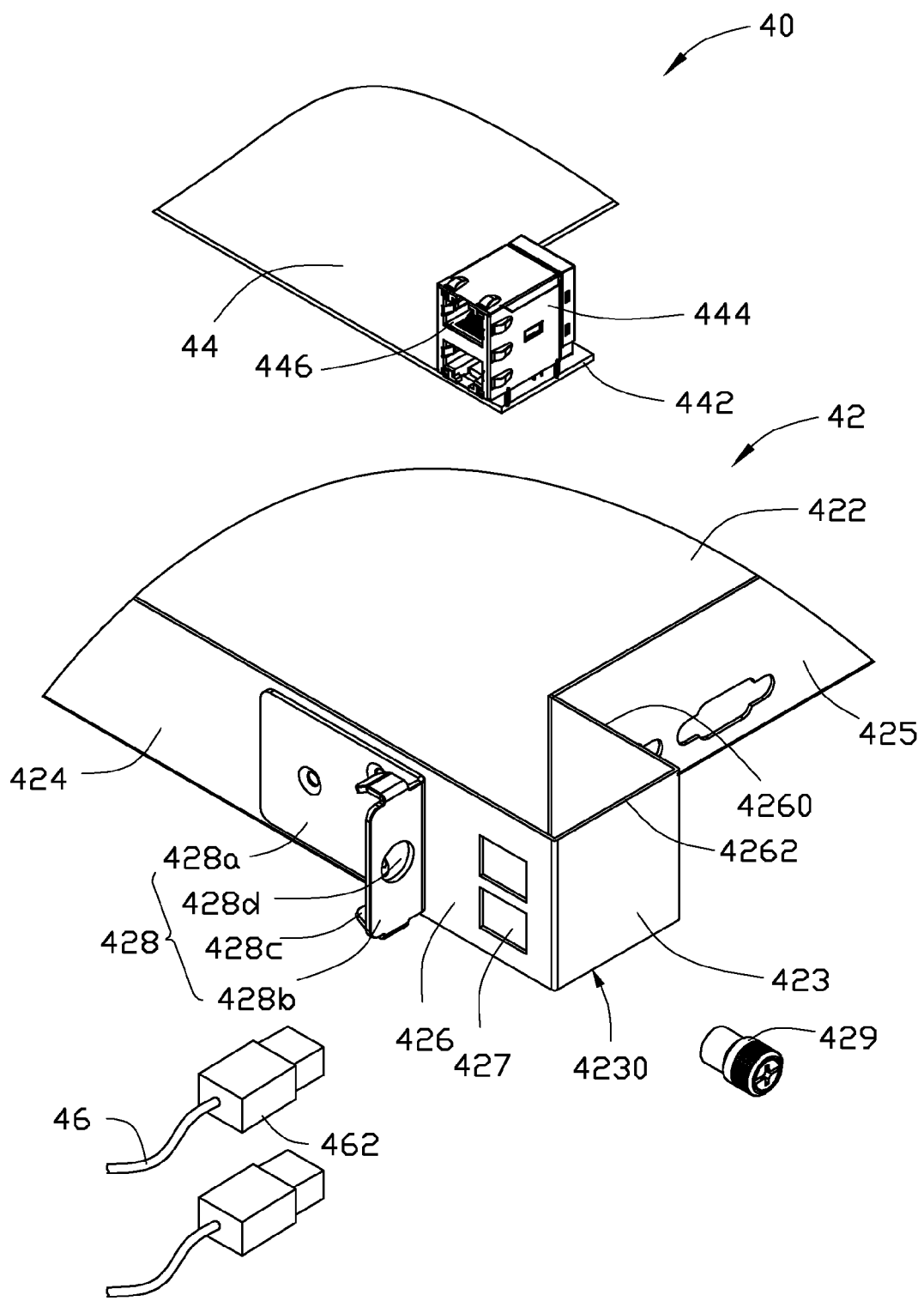
FIG. 2 is an exploded, partially cutaway, isometric view of the circled portion II of FIG. 1.

FIG. 1 and FIG. 2 show a first exemplary embodiment of a server cabinet 100 including a rack 20 and a server unit 40 installed in the rack 20.

The rack 20 includes a rectangular base 22 and four support poles 24 perpendicularly extending up from the base 22. Each support pole 24 defines a plurality of positioning holes 26 along the lengthwise direction of the support pole 24.

The server unit 40 includes a casing 42, a motherboard 44, and two cables 46. The casing 42 includes a bottom wall 422, a sidewall 424 perpendicularly extending up from the bottom wall 422, and a rear wall 425 perpendicularly extending up from the bottom wall 422 and perpendicular to the sidewall 424. A first side plate 426 extends rearward from an end of the sidewall 424 adjacent to the rear wall 425, and is coplanar with the sidewall 424. A second side plate 4260 perpendicularly extends rearward from an end of the rear wall 425 adjacent to the sidewall 424, parallel to the first side plate 426. A connection plate 4262 is perpendicularly connected between rear ends of the first and second side plates 426 and 4260. A supporting plate 4230 extends from the bottom wall 422 to be connected to the first and second side plates 426 and 4260, and the connection plate 4262. The first and second side plates 426 and 4260, the connection plate 4262, and the supporting plate 4230 together form a rectangular receiving portion 423. The first side plate 426 defines two through holes 427. A substantially L-shaped fixing member 428 is fixed on an outside surface of the sidewall 424, adjacent to the receiving portion 423. The fixing member 428 includes a fixing plate 428a fixed on the sidewall 424, a positioning plate 428b perpendicularly extending out from a rear end of the fixing plate 428a, and two hooks 428c extending forward from a top end and a bottom end of the positioning plate 428b. The positioning plate 428b defines a fixing hole 428d.

The motherboard 44 is substantially rectangular, and includes an extending portion 442 extending rearward from a rear side of the motherboard 44. A connector assembly 444 is mounted on the extending portion 442. The connector assembly 444 includes two connectors 446.

A connector 462 is installed to an end of each cable 46. In the embodiment, the cables 46 are signal transmission lines.

In assembly of the motherboard 44 to the casing 42, the motherboard 44 is installed on the bottom wall 422 of the casing 42, to allow the extending portion 442 to be supported on the supporting plate 4230. The connector 444 is received in the receiving portion 423. The connectors 446 respectively align with the through holes 427 of the receiving portion 423.

In assembly of the server unit 40 to the rack 20, the server unit 40 is inserted into the rack 20. The hooks 428c of the fixing member 428 are respectively inserted into the positioning holes 26 of the corresponding support pole 24. A fastener 429 extends through the fixing hole 428d of the fixing member 428, to fix in a corresponding positioning hole 26 between the hooks 428c. A front end wall of the server unit 40 opposite to the rear wall 425 and an end of the rear wall 425 away from the receiving portion 423 are fixed to the corresponding support poles 24 through fasteners 429. The connectors 462 respectively extend through the through holes 427, to be connected to the corresponding connectors 446 of the connector assembly 444.

Figure 3:
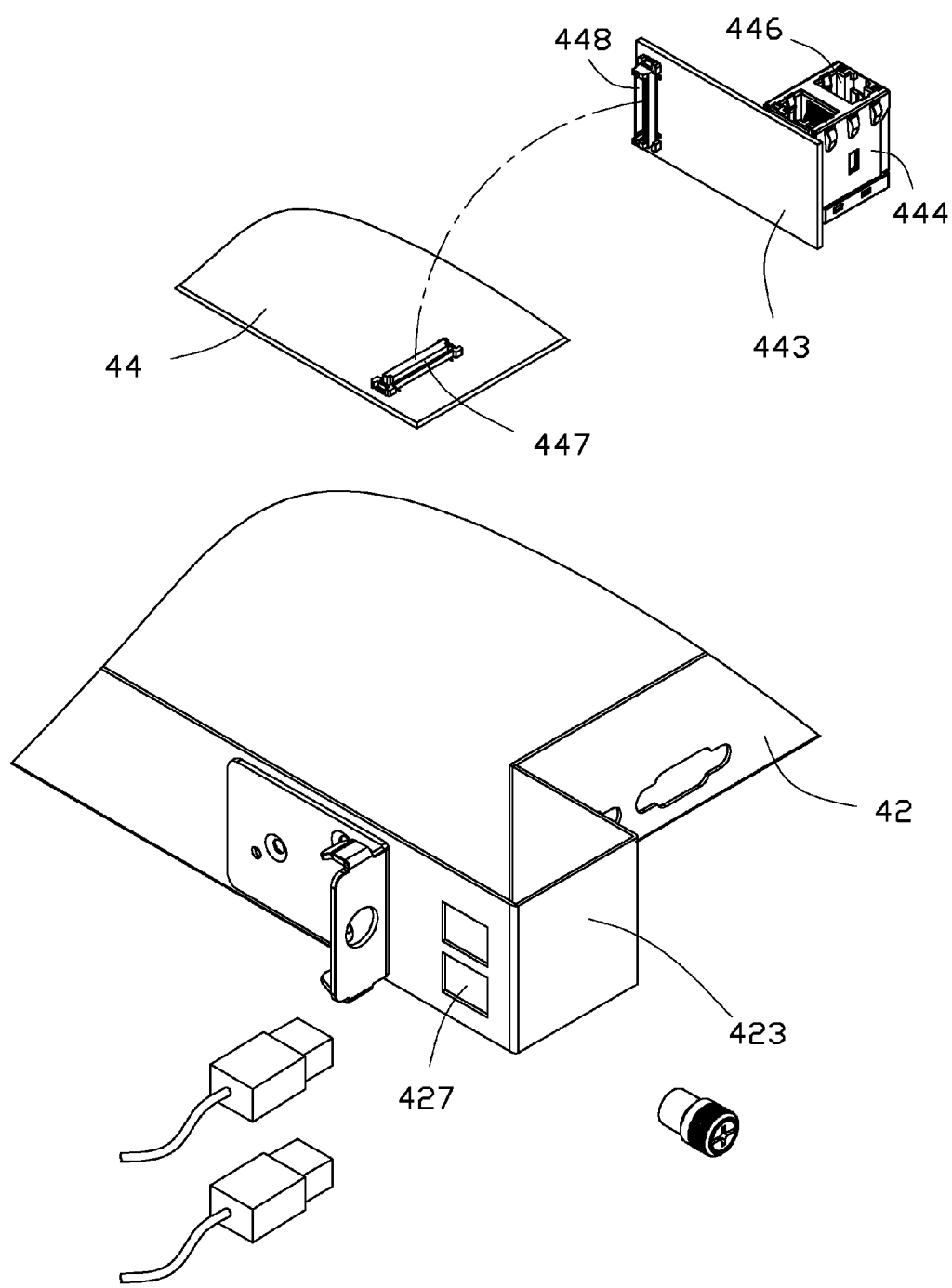
FIG. 3 is an exploded, partially cutaway, isometric view of a second exemplary embodiment of a server unit of a server cabinet.

Referring to FIG. 3, a second embodiment of a server cabinet is substantially similar to the first embodiment of the server cabinet 100, except that a circuit board 443 replaces the extending portion 442 of the motherboard 44 of the first embodiment. A male connector 447 is mounted on the motherboard 44, the connector assembly 444 is mounted on a top surface of the circuit board 443, and a female connector 448 is mounted to a bottom surface of the circuit board 443 away from the connector assembly 444. In assembly, the female connector 448 of the circuit board 443 is connected to the male connector 447 of the motherboard 44. The combined assembly of the motherboard 44 and the circuit board 443 is installed in the casing 42. Thereby, the connector assembly 444 is received in the receiving portion 423, and the connectors 446 respectively align with the through holes 427 of the receiving portion 423.

In use, the receiving portion 423 is located at a rear of the corresponding support pole 24 and the connectors 446 face the support pole 24, so the connectors 462 of the cables 46 directly extend through the through holes 427 to be connected to the corresponding connector 446. The cables 46 do not occupy the space behind the rear wall 425 of the casing 42.

Even though numerous characteristics and advantages of the embodiments have been set forth in the foregoing description, together with details of the structure and function of the embodiments, the present disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. A server, comprising:
   a casing comprising a sidewall, a rear wall substantially perpendicular to the sidewall, and a receiving portion extending rearward from the rear wall and adjacent to the sidewall, the receiving portion comprising a first side plate parallel to the sidewall, the first side plate defining a through hole; and a motherboard accommodated in the casing, and comprising a connector aligning with and exposed through the through hole.

2. The server of claim 1, wherein the first side plate extends rearward from a rear end of the sidewall, and is coplanar with the sidewall.

3. The server of claim 2, wherein the server unit further comprises a bottom wall, the sidewall perpendicularly extends up from the bottom wall, the rear wall perpendicularly extends up from the bottom wall, the receiving portion further comprises a second plate extending rearward from an end of the rear wall adjacent to the sidewall, a connection plate connected between rear ends of the first and second side plates, and a supporting plate extending from the bottom wall to be connected to the first and second side plate and the connection plate.

4. The server of claim 3, wherein the motherboard comprises an extending portion extending rearward from the motherboard to be supported on the supporting plate, the second connector is mounted on the extending portion.

5. The server of claim 3, wherein the motherboard comprises a circuit board, a first end of the circuit board is connected to the motherboard, and a second end of the circuit board is received in the receiving portion, the second connector is mounted on the second end of the circuit board.

6. The server of claim 5, wherein a male connector is mounted on the motherboard, a female connector is mounted to a bottom of the circuit board to be connected to the male connector.

7. A server cabinet, comprising:
a rack; and
a server unit installed in the rack, and comprising a casing, a motherboard accommodated in the casing, and a cable with a first connector, the casing comprising a sidewall, a rear wall substantially perpendicular to the sidewall, and a receiving portion extending rearward from the rear wall and adjacent to the sidewall, the motherboard comprising a second connector, the receiving portion comprising a first side plate parallel to the sidewall, the first side plate defining a through hole aligning with the second connector, the first connector extending through the through hole to be connected to the second connector.

8. The server cabinet of claim 7, wherein the first side plate extends rearward from a rear end of the sidewall, and is coplanar with the sidewall.

9. The server cabinet of claim 8, wherein the server unit further comprises a bottom wall, the sidewall perpendicularly extends up from the bottom wall, the rear wall perpendicularly extends up from the bottom wall, the receiving portion further comprises a second plate extending rearward from an end of the rear wall adjacent to the sidewall, a connection plate connected between rear ends of the first and second side plates, and a supporting plate extending from the bottom wall to be connected to the first and second side plate and the connection plate.

10. The server cabinet of claim 9, wherein the motherboard comprises an extending portion extending rearward from the motherboard to be supported on the supporting plate, the second connector is mounted on the extending portion.

11. The server cabinet of claim 9, wherein the motherboard comprises a circuit board, a first end of the circuit board is connected to the motherboard, and a second end of the circuit board is received in the receiving portion, the second connector is mounted on the second end of the circuit board.

12. The server cabinet of claim 11, wherein a male connector is mounted on the motherboard, a female connector is mounted to a bottom of the circuit board to be connected to the male connector.

13. The server cabinet of claim 7, wherein the rack comprise a base and a plurality of support poles extending up from the base, a fixing member is fixed on an outside surface of the sidewall adjacent to the receiving portion to be fixed to a corresponding support pole, the through hole is at a same side of the support pole.

14. The server cabinet of claim 13, wherein each support pole defines a plurality of positioning holes along the lengthwise direction of the support pole, the fixing member comprises a fixing plate fixed on the sidewall, a positioning plate extending out from a rear end of the fixing plate, and two hooks extending from two ends of the positioning plate to be respectively inserted into two positioning holes of the support pole.

* * * * *